US008786911B2

(12) United States Patent
Noguchi (10) Patent No.: US 8,786,911 B2
(45) Date of Patent: Jul. 22, 2014

(54) IMAGE PROCESSING DEVICE AND METHOD FOR PRINTING A TWO-DIMENSIONAL CODE USING A HISTORY RECORD STORAGE UNIT

(71) Applicant: Fuji Xerox Co., Ltd., Tokyo (JP)

(72) Inventor: Takeshi Noguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 49 days.

(21) Appl. No.: 13/623,463

(22) Filed: Sep. 20, 2012

(65) Prior Publication Data

US 2013/0215475 A1 Aug. 22, 2013

(30) Foreign Application Priority Data

Feb. 16, 2012 (JP) ................................. 2012-031729

(51) Int. Cl.
*H04N 1/04* (2006.01)

(52) U.S. Cl.
USPC .......... 358/474; 358/448; 358/1.13; 358/1.15

(58) Field of Classification Search
CPC .............. H04N 2201/3232; H04N 2201/3226; H04N 2201/3216; H04N 2201/3205; H04N 2201/3269
See application file for complete search history.

(56) References Cited

U.S. PATENT DOCUMENTS

| | | | | |
|---|---|---|---|---|
| 8,081,848 B2 * | 12/2011 | Gutarin | ........................ | 382/306 |
| 8,203,748 B2 * | 6/2012 | Tojo | .............................. | 358/1.9 |
| 8,233,166 B2 * | 7/2012 | Ogasawara | .................. | 358/1.13 |
| 8,237,963 B2 * | 8/2012 | Urakawa | ...................... | 358/1.15 |
| 8,411,313 B2 * | 4/2013 | Kihara | ........................ | 358/1.18 |
| 2004/0119998 A1 * | 6/2004 | Xiong | .......................... | 358/1.13 |
| 2009/0073501 A1 * | 3/2009 | Gutarin | ........................ | 358/403 |
| 2009/0161149 A1 * | 6/2009 | Noguchi et al. | ............. | 358/1.15 |
| 2009/0195826 A1 * | 8/2009 | Urakawa | ...................... | 358/1.15 |
| 2012/0105888 A1 * | 5/2012 | Nakayama | .................. | 358/1.13 |

FOREIGN PATENT DOCUMENTS

JP 2006-303801 A 11/2006

* cited by examiner

*Primary Examiner* — Dung Tran
(74) *Attorney, Agent, or Firm* — Sughrue Mion, PLLC (57) ABSTRACT

Provided is an image processing device including an image sequence acquisition unit acquiring a read image sequence made up of images read from each of recording media on which a two-dimensional code enabling a page number of a document to be specified is printed, a page number specifying unit specifying the page number corresponding to each of the read images in the read image sequence based on a reading result of the two-dimensional code image, and a page number determining unit determining the page number corresponding to a target image which is a read image of which the page number is not specified based on a position of the target image in the read image sequence, a position in the read image sequence, of the read image of which the page number is specified, and the page number corresponding to the read image of which the page number is specified.

6 Claims, 14 Drawing Sheets

| SHEET ID | DOCUMENT ID | PAGE NUMBER (n) | TEXT INFORMATION |
|---|---|---|---|
| SHEET A | DOCUMENT A | 1 | AAII... |
| SHEET B | DOCUMENT A | 2 | UUEE... |
| SHEET C | DOCUMENT A | 3 | OOKAKA... |
| SHEET D | DOCUMENT A | 4 | KIKIKUKU... |
| SHEET a | DOCUMENT B | 1 | |
| SHEET b | DOCUMENT B | 2 | |
| SHEET c | DOCUMENT B | 3 | |
| SHEET d | DOCUMENT B | 4 | |
| SHEET e | DOCUMENT B | 5 | |
| SHEET X | DOCUMENT C | 1 | |
| ... | ... | ... | |

| m | DECODED DOCUMENT ID ($D_m$) | DECODED PAGE NUMBER ($P_m$) | DECODED TEXT INFORMATION ($T_m$) | DECODED SHEET ID ($N_m$) | FLAG ($F_m$) |
|---|---|---|---|---|---|
| m=1 | $D_1$=NULL | $P_1$=NULL | $T_1$=NULL | $N_1$=NULL | $F_1$=NULL |
| m=2 | $D_2$=NULL | $P_2$=NULL | $T_2$=NULL | $N_2$=NULL | $F_2$=NULL |
| m=3 | $D_3$=NULL | $P_3$=NULL | $T_3$=NULL | $N_3$=NULL | $F_3$=NULL |
| m=4 | $D_4$=NULL | $P_4$=NULL | $T_4$=NULL | $N_4$=NULL | $F_4$=NULL |

IMAGE PROCESSING DEVICE AND METHOD FOR PRINTING A TWO-DIMENSIONAL CODE USING A HISTORY RECORD STORAGE UNIT

CROSS-REFERENCE TO RELATED APPLICATIONS

This application is based on and claims priority under 35 USC 119 from Japanese Patent Application No. 2012-031729 filed Feb. 16, 2012.

BACKGROUND

Technical Field

The present invention relates to an image processing device, a non-transitory computer readable medium storing a program, and an image processing method.

SUMMARY

According to an aspect of the invention, there is provided an image processing device including: an image sequence acquisition unit that acquires a read image sequence made up of read images that are sequentially read by an image reading unit from each of plural sheet-shaped information recording media on which a two-dimensional code that enables a page number of a document to be specified is printed; a page number specifying unit that specifies the page number corresponding to each of the read images in the read image sequence based on a reading result of the two-dimensional code image in the read image; and a page number determining unit that determines the page number corresponding to a target image which is a read image of which the page number is not specified by the page number specifying unit based on a position of the target image in the read image sequence, a position in the read image sequence, of the read image of which the page number is specified by the page number specifying unit, and the page number corresponding to the read image of which the page number is specified by the page number specifying unit.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the drawings.

Figure 1:
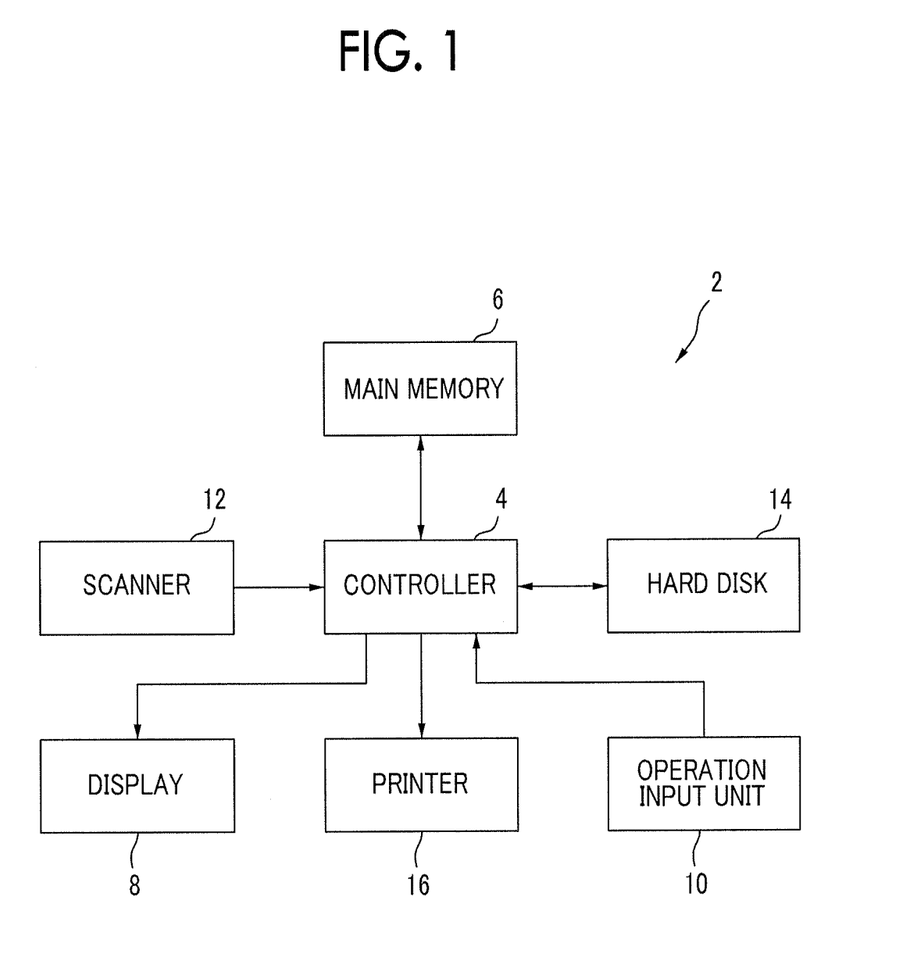
FIG. 1 is a diagram illustrating a configuration of an image processing device.

FIG. 1 is a diagram illustrating a configuration of an image processing device 2 according to an exemplary embodiment of the invention. In this exemplary embodiment, the image processing device 2 is implemented as a multi-function machine that includes a scanning function of reading an image on the surface of a sheet (sheet-shaped information recording medium) and a printing function of printing an image on the sheet.

The image processing device 2 includes a controller 4 and a main memory 6. The controller 4 is a microprocessor and executes various types of information processing according to a program stored in the main memory 6. The main memory 6 stores the program and the information required during execution of the information processing. The program may be read from a computer readable information storage medium such as a DVD (registered trademark) -ROM and stored in the main memory 6 and may be supplied from a communication network such as a network and stored in the main memory 6.

Moreover, the image processing device 2 includes a display 8 and an operation input unit 10. The display 8 is a liquid crystal display, for example, and displays information output from the controller 4. Moreover, the operation input unit 10 is a mouse, a keyboard, and the like which are interfaces for allowing a user to input operations, and outputs a signal representing the content of an operation input by the user to the controller 4.

Moreover, the image processing device 2 includes a scanner 12 (an image reading unit). In the case of this exemplary embodiment, the scanner 12 includes an auto document feeder (hereinafter referred to as an ADF) and is configured to scan the surface of a sheet sequentially transported from the ADF and generate bitmap data of the respective scan images read from the surface of the sheet.

Moreover, the image processing device 2 includes a hard disk 14. The hard disk 14 serves as an auxiliary storage device, and in the case of this exemplary embodiment, stores documents created by a document creation application, for example.

Information other than the documents stored in the hard disk 14 will be described later.

Figure 2A:
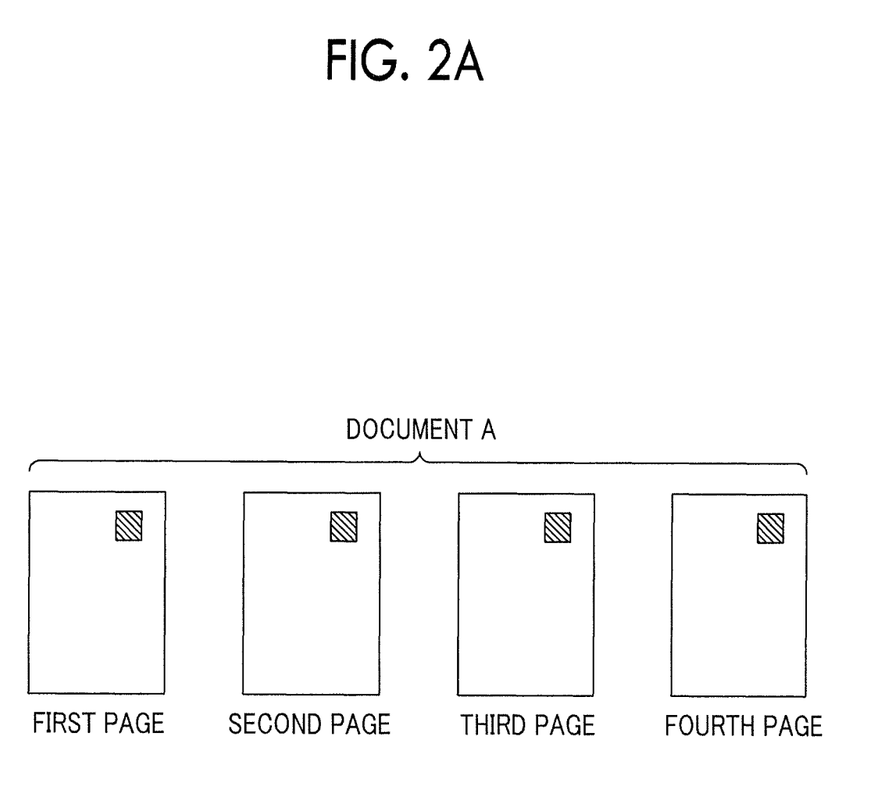
FIG. 2A is a diagram illustrating a sheet on which a combined image is printed.

Moreover, the image processing device 2 includes a printer 16. When the user inputs a print instruction, the printer 16 prints an image of each of the pages of a document on a sheet held in a sheet holder (not illustrated). In this case, when the user inputs a special print instruction, the printer 16 prints a QR code as well as the image of the document on each page of the sheets. Specifically, when the user inputs a special print instruction, a combined image obtained by combining the image of each of the pages with an image of the QR code is generated, and the generated combined image is printed by the printer 16. In the case of this exemplary embodiment, an ID (hereinafter referred to as a sheet ID) of a sheet on which a QR code is printed and text information are embedded in the QR code. FIG. 2A illustrates a state where a combined image is printed with respect to a document A which is made up of four pages.

Figure 3:
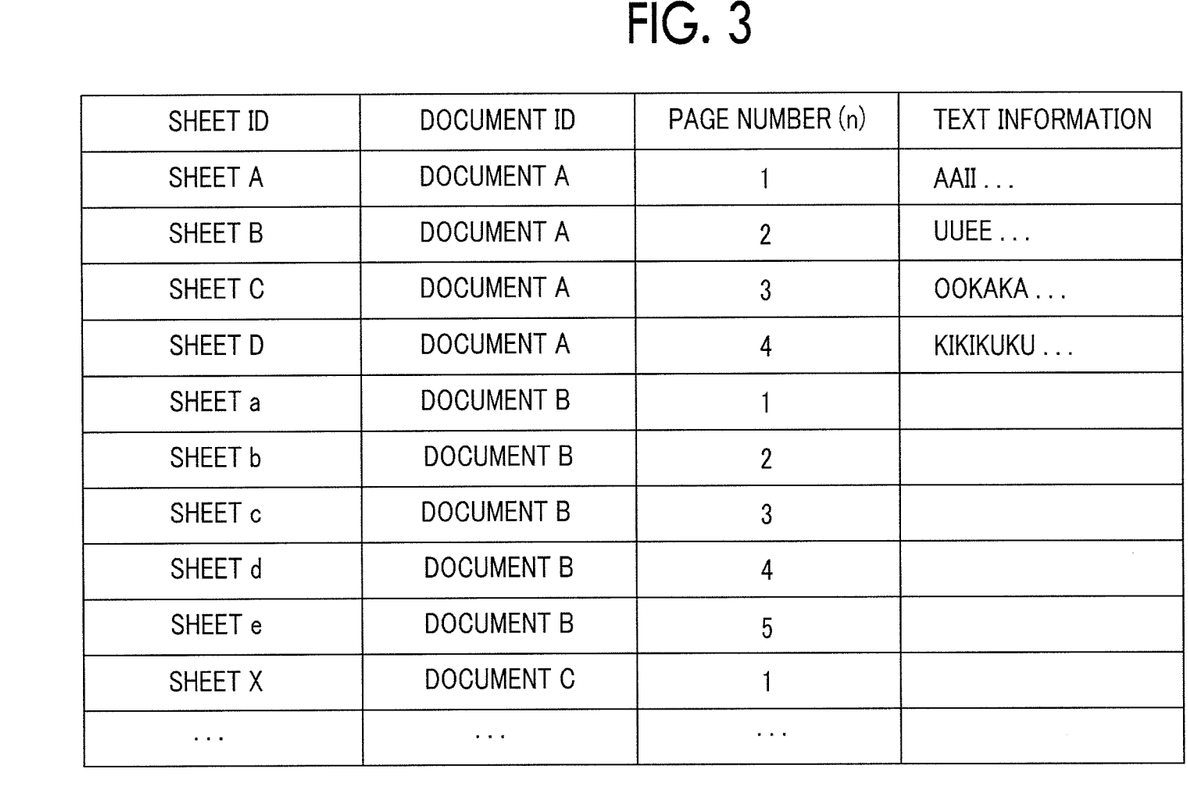
FIG. 3 is a diagram illustrating a history record.

The image processing device 2 stores the print history of the combined image. That is, a record (hereinafter referred to as a history record) which includes text information embedded in the QR code printed on each of the sheets on which the combined image is printed, a sheet ID of the sheet, the ID (hereinafter referred to as a document ID) of a document printed on the sheet, and a page number "n" of a page of the document printed on the sheet is generated and stored in the hard disk 14. FIG. 3 illustrates the history record stored in the hard disk 14.

The image processing device 2 includes a function of scanning the surface of a sheet, on which a combined image is printed, to obtain a scan image and decoding the text information embedded in the QR code within the scan image. Here, for example, when a combined image is overwritten to a printed sheet so that a part of a QR code becomes deficient as in the second page from the left of FIG. 2B, it may be difficult to decode the text information embedded in the QR code from the QR code.

Therefore, in the image processing device 2, in order to decode the text information embedded in the deficient QR code, it is recommended to load the sheets of each document on the ADF rather than loading a single sheet including the deficient QR code on the ADF. For example, it is recommended to load a group of sheets that constitute a document A on the ADF rather than loading only the second sheet from the left of FIG. 2B on the ADF.

Figure 4A:
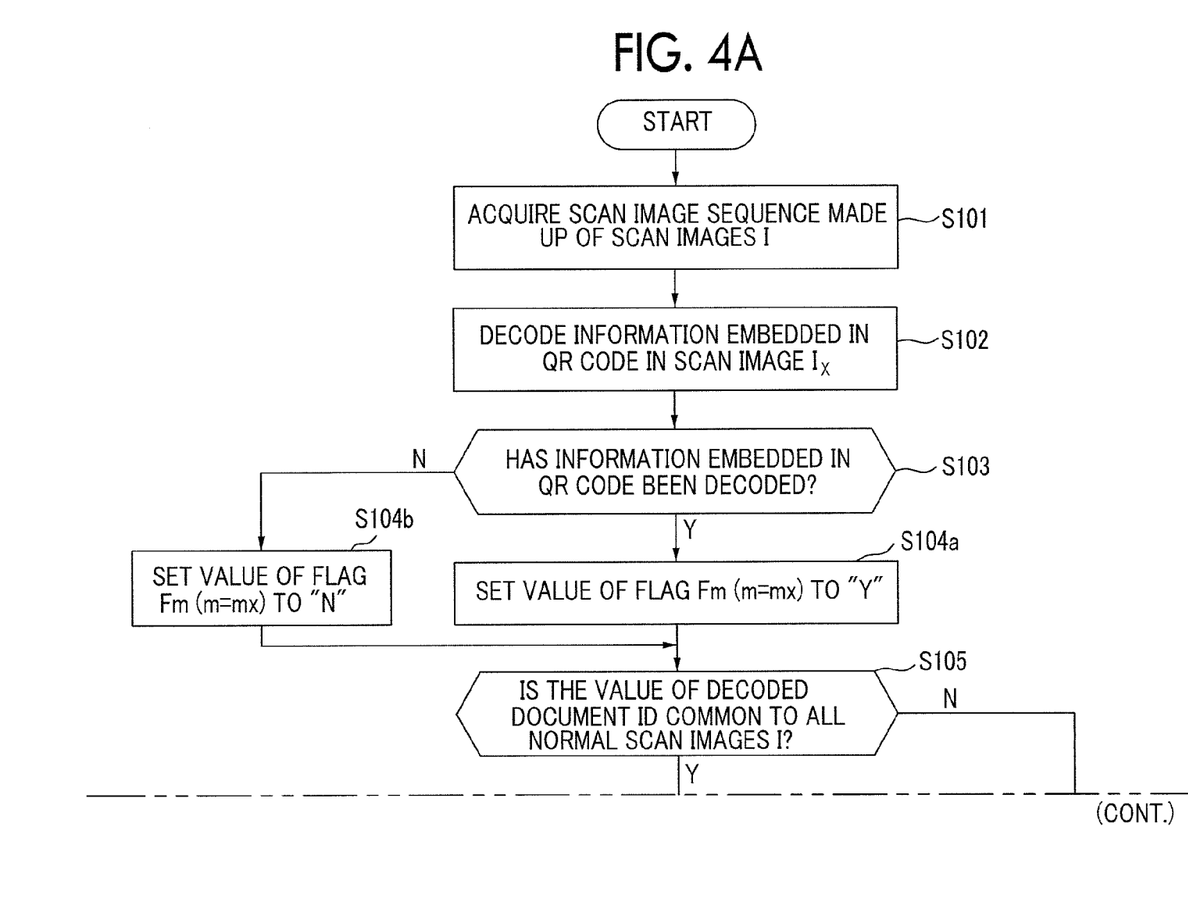
FIG. 4A is a flowchart illustrating a process executed by a controller.
Figure 4B:
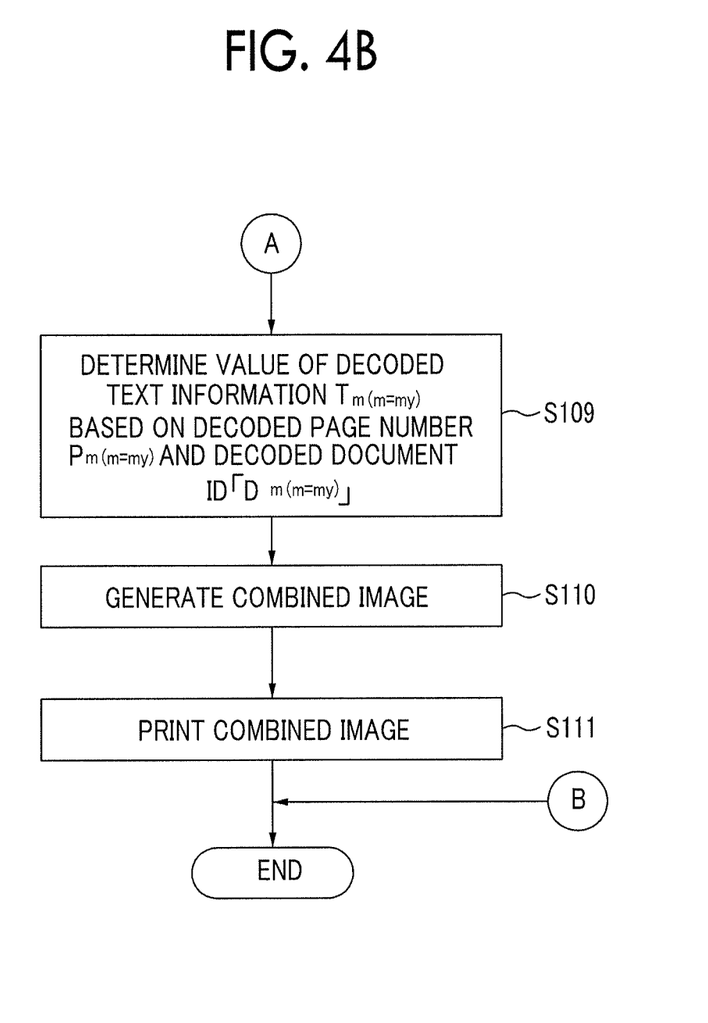
FIG. 4B is a flowchart illustrating a process executed by a controller.

In this state, the image processing device 2 executes the processes illustrated in FIGS. 4A and 4B in order to decode the text information. The processes will be described below.

Figure 2B:
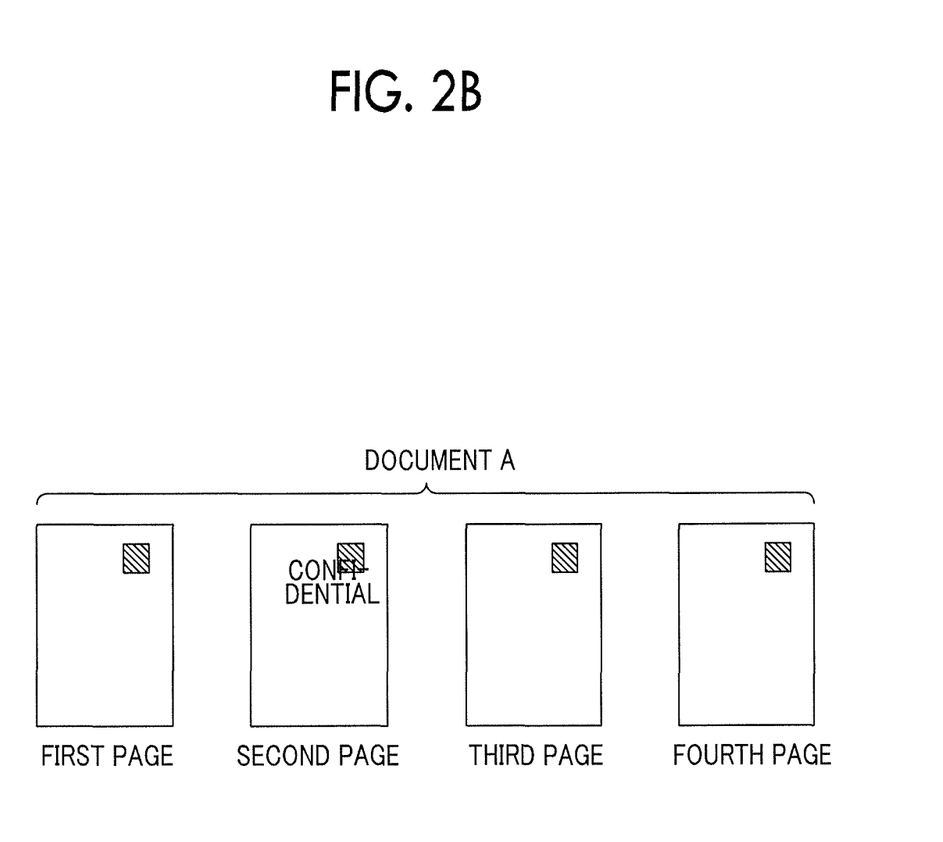
FIG. 2B is a diagram illustrating a sheet on which a combined image is printed.

FIGS. 4A and 4B are flowcharts illustrating the processes that the controller 4 executes according to the program. In the case of this exemplary embodiment, the processes illustrated in the drawings are executed when the user inputs a decoding instruction. In this example, a case where the decoding instruction is input in a state where a group of sheets illustrated in FIG. 2B are loaded on the ADF will be described.

Figure 5:
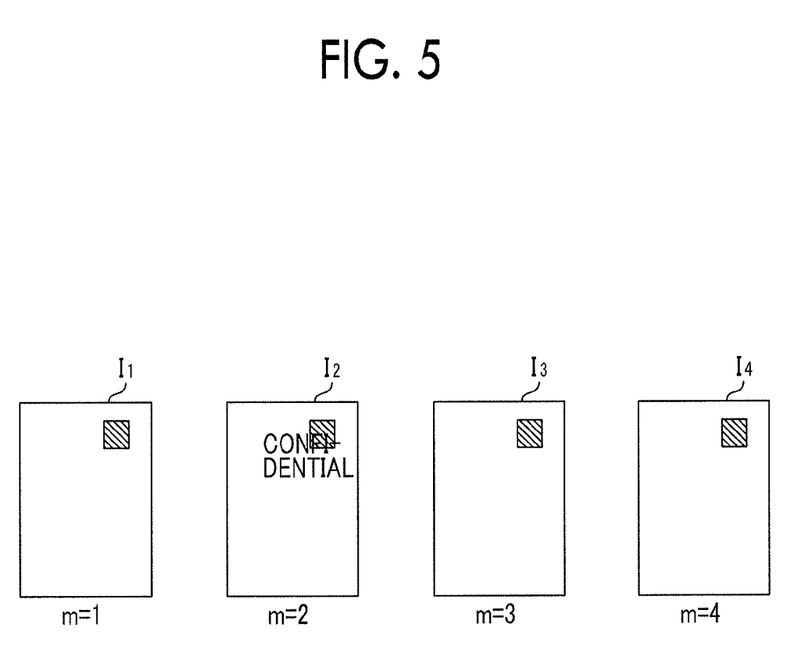
FIG. 5 is a diagram illustrating a scan image sequence.

First, the controller 4 (image sequence acquisition unit) acquires a scan image sequence made up of scan images I of the respective sheets read by the scanner 12 (S101). That is, whenever the scanner 12 scans the surface of a sheet sequentially transported by the ADF, the controller 4 generates a scan image I of the sheet and assigns a scan number "m" indicating a scanning order to the generated scan image I. For example, a scan number of "1" is assigned to the scan image I that is generated at the "1"st time. FIG. 5 illustrates a scan image sequence. The scan image I having a scan number of "m" is denoted by a scan image $I_m$. The scan number "m" indicates the position of the scan image $I_m$ in the scan image sequence.

Figure 6:
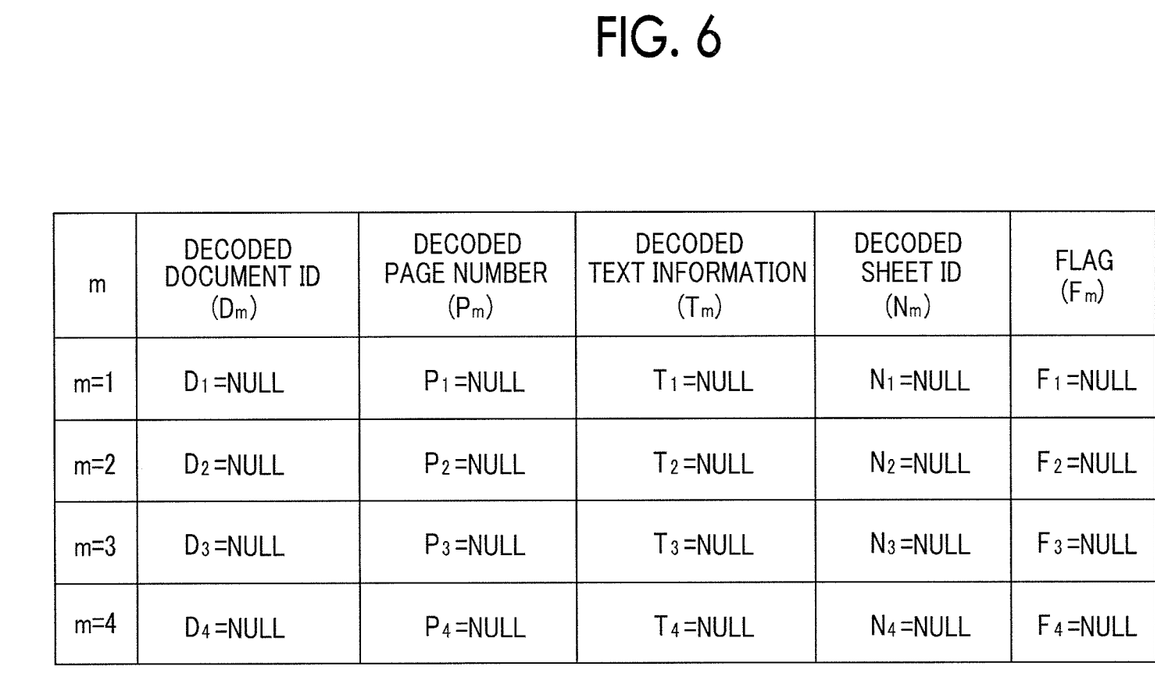
FIG. 6 is a diagram illustrating the record of respective scan images.

In step S101, the controller 4 generates records of the respective scan images I and stores the records in the main memory 6. FIG. 6 illustrates the records stored in the main memory 6. As illustrated in FIG. 6, the record of the scan image $I_m$ includes the scan number "m" indicating the scanning order of the scan image $I_m$, a decoding document ID "$D_m$", a decoded page number "$P_m$", decoding text information "$T_m$", a decoding sheet ID "$N_m$", and a flag "$F_m$". At this point in time, a null value is set to the decoding document ID "$D_m$", the decoded page number "$P_m$", the decoding text information "$T_m$", the decoding sheet ID "$N_m$", and the flag "$F_m$".

The meanings of the decoding document ID "$D_m$", the decoded page number "$P_m$", the decoding text information "$T_m$", the decoding sheet ID "$N_m$", and the flag "$F_m$" will be described later.

Moreover, after performing the process of step S101, the controller 4 executes the processes of steps S102, S103, S104a, and S104b with respect to the respective scan images I. For example, the processes of the steps are executed in ascending order of the scan numbers "m".

In the following description, a scan image $I_{m(m=mx)}$ that is subjected to the processes of the steps will be referred to as a scan image Ix.

First, the controller 4 (page number specifying unit) reads a QR code included in the scan image Ix and decodes the text information and the sheet ID embedded in the QR code from a bit string which is the reading result (S102). Specifically, first, the controller 4 detects the QR code in the scan image Ix by detecting a starting symbol in the QR code. Moreover, the controller 4 decodes the text information and the sheet ID from the detected QR code. When the starting symbol is not detected, the QR code is not detected from the scan image Ix. Thus, in this case, "it is not possible to decode the text information and the sheet ID." Moreover, even when the QR code is detected, if a portion in which a number of identical bit values are continuously arranged is present in a bit string obtained from the QR code due to deficiency of the QR code, and an error correction code is embedded in the QR code, "it is not possible to decode the text information and the sheet ID."

When the text information and the sheet ID are decoded in step S102 (S103: Y), the controller 4 sets the value of a flag "$F_{m(m=mx)}$" to a value "Y" indicating that it is possible to decode information embedded in the QR code (S104a).

In step S104a, the controller 4 sets the value of decoding text information "$T_{m(m=mx)}$" to the value of the text information decoded from the QR code and sets the value of the decoding sheet ID "$N_{m(m=mx)}$" to the value of the sheet ID decoded from the QR code. Moreover, the controller 4 (page number specifying unit) specifies a history record including both a sheet ID having the same value as the value of the sheet ID decoded from the QR code and text information having the same value as the value of the text information decoded from the QR code, among the history records (see FIG. 3) stored in the hard disk 14. Then, the controller 4 sets the value of the decoding document ID "$D_{m(m=mx)}$" to the value of the document ID included in the specified history record and sets the value of the decoded page number "$P_{m(m=mx)}$" to the value of the page number "n" included in the specified history record.

For example, when the scan image Ix is a scan image $I_1$ (see FIG. 6), that is, when the scan number "m" is "1", a sheet ID value "sheet A" and text information "AAII . . . " are decoded from the QR code in the scan image $I_1$. Thus, the value of "$F_1$" included in the record of the scan image $I_1$ is set to "Y", the value of "$N_1$" is set to "sheet A", and the value of "$T_1$" is set to "AAII . . . ." Moreover, since the first history record (see FIG. 3) from the top that includes the sheet ID value "sheet A" and the text information "AAII . . . " includes the value "1" of the page number "n" and the document ID value "document A", the value of "$P_1$" is set to "1" and the value of "$D_1$" is set to "document A".

On the other hand, when the text information and the sheet ID are not decoded in step S102 (S103: N), the controller 4 sets the value of the flag "$F_{m(m=mx)}$" to a value "N" indicating that it is not possible to decode the information embedded in the QR code (S104b).

For example, when the scan image Ix is a scan image $I_2$ (see FIG. 6), that is, when the scan number "m" is "2", it is not possible to decode the sheet ID and the text information from the QR code in the scan image $I_2$. Thus, the value of "$F_2$" included in the record of the scan image $I_1$ is set to "N".

Figure 7:
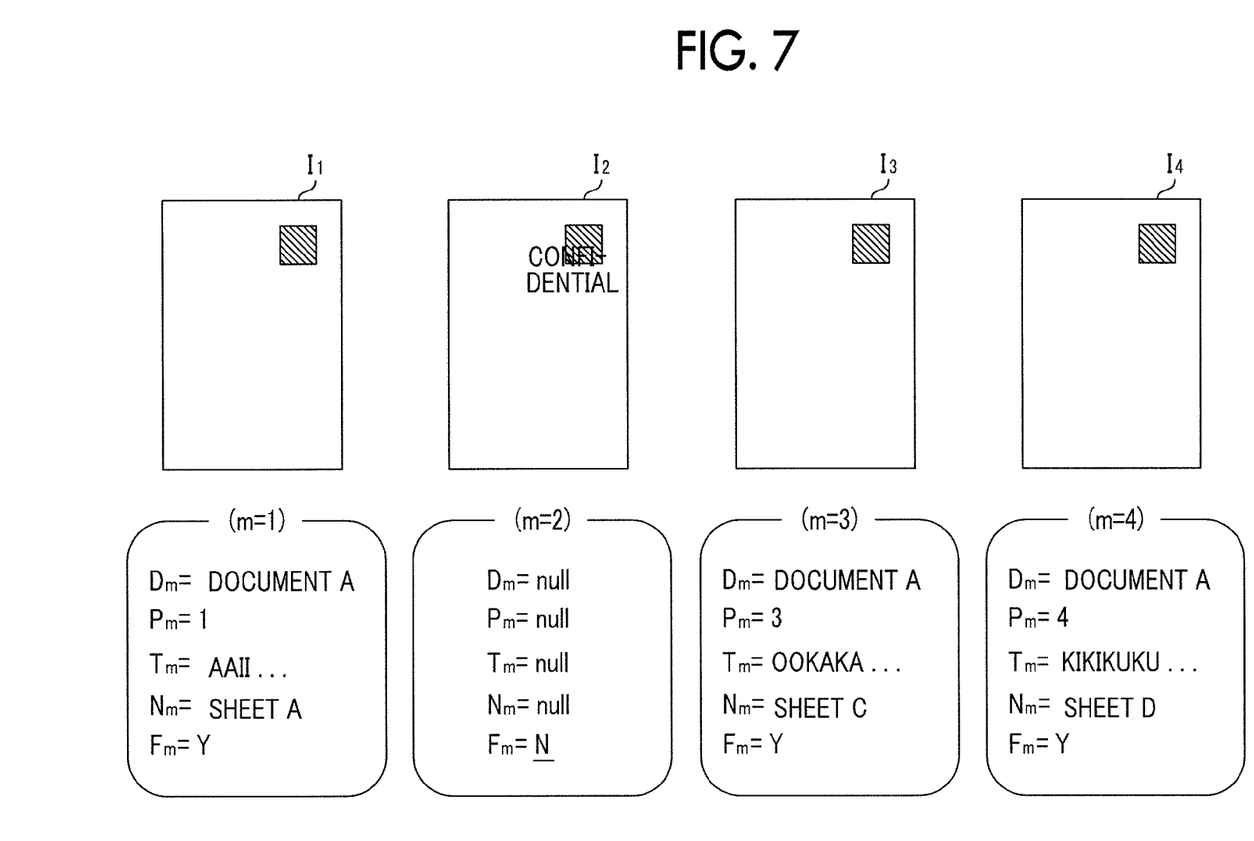
FIG. 7 is a diagram conceptually illustrating the content of the record of respective scan images.

FIG. 7 conceptually illustrates the content of the records of the respective scan images I immediately after the processes of steps S102, S103, S104a, and S104b are executed on all scan images I.

When the processes of the steps S102, S103, S104a, and S104b are executed for all scan images I, the controller 4 executes the processes described below. In the following description, a scan image $I_{m(m=my)}$ in which it is not possible to decode the information embedded in the QR code will be referred to as an abnormal scan image I, and a scan image I in which it is possible to decode the information embedded in the QR code will be referred to as a normal scan image I. The value of the flag "$F_m$" is "N" in the record of the abnormal scan image I, and the value of the flag "$F_m$" is "Y" in the record of the normal scan image I. In the case of FIG. 7, the scan image $I_2$ corresponds to the abnormal scan image I, and the scan images $I_1$, $I_3$, and $I_4$ correspond to the normal scan image I. The abnormal scan image I corresponds to a "target image".

First, the controller 4 determines whether the value of the decoding document ID "$D_m$" is common to all normal scan images I (S105). That is, the controller 4 determines whether the values of the decoding document IDs "$D_m$" set in the records of the respective normal scan images I are the same.

Figure 8:
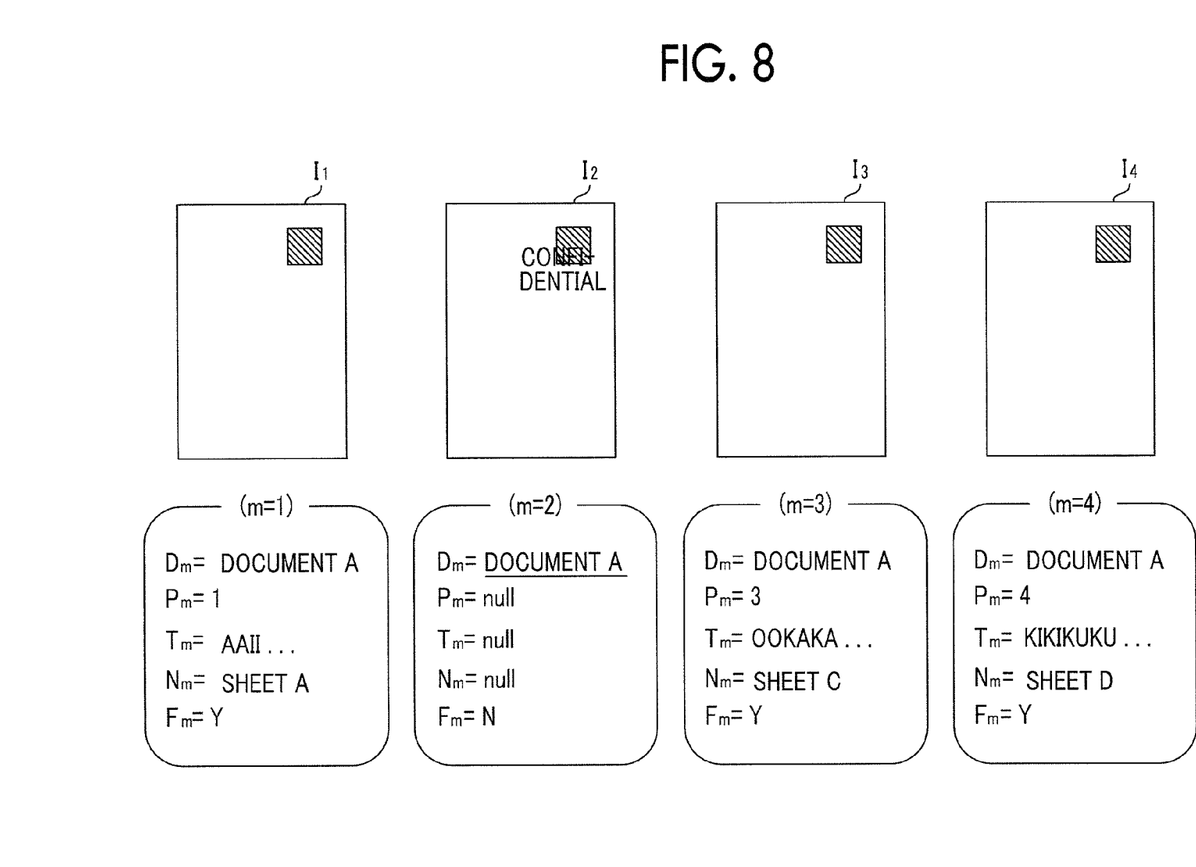
FIG. 8 is a diagram conceptually illustrating the content of the record of respective scan images.

Moreover, when the value of the decoding document ID "$D_m$" is common to all normal scan images I (S105: Y), the controller 4 sets "$D_{m(m=my)}$" to the value of "$D_m$" that is set to be common to all normal scan images I (S106). That is, the controller 4 sets the value of "$D_{m(m=my)}$" to the same value as the value of "$D_m$" that is set to be common to all normal scan images I. FIG. 8 conceptually illustrates the content of the records of the respective scan images I immediately after the process of step S106 is executed. As illustrated in FIG. 7, the same value "document A" is set to "$D_1$", "$D_3$", and "$D_4$". Thus, as illustrated in FIG. 8, the value of "$D_2$" in the record of the abnormal scan image $I_2$ is set to "document A".

Moreover, in order to determine whether it is possible to estimate the information embedded in the QR code in the abnormal scan image I, the controller 4 (page number determining unit) sets a normal scan image $I_{m(m=ms)}$ having the smallest scan number "m" among the normal scan images I as a reference scan image I and determines in steps S107 and S108 whether each of the normal scan images $I_{m(m \ne ms)}$ other than the reference scan image I satisfies any one of the following two equations in common.

That is, in step S107, the controller 4 (page number determining unit) determines whether all of the normal scan images $I_{m(m \ne ms)}$ other than the reference scan image I satisfy the following equation (S107).

$$P_m - P_{m(m=ms)} = m - ms$$

For example, in the case of FIG. 8, the reference scan image I is the scan image $I_1$. Thus, both the scan number "ms" and the decoded page number "$P_{m(m=ms)}$" are "1" (see FIG. 8). Looking at the normal scan image $I_3$, as can be understood from FIG. 8, both the scan number "m" and the decoded page number "$P_m$" are "3", and the above equation is satisfied. Moreover, looking at the normal scan image $I_4$, as can be understood from FIG. 8, both the scan number "m" and the decoded page number "$P_m$" are "4", and the above equation is satisfied. Thus, in the case of FIG. 8, since the above equation is satisfied in both the normal scan image $I_3$ and the normal scan image $I_4$, a positive determination result is obtained in step S107.

The scan number "m" is not always assigned as illustrated in FIGS. 5, 7, and 8. For example, when scanning of the sheets starts with a sheet on which the last page is printed, the scanning order indicated by the scan number "m" assigned to the respective scan images I may be reversed from that illustrated in the above drawings as illustrated in FIG. 9.

Taking such a case into consideration, when a negative determination result is obtained in step S107 (S107: N), the controller 4 (page number determining unit) determines in step S108 whether all normal scan images $I_{m(m \ne ms)}$ other than the reference scan image I satisfy the following equation (S108).

$$P_m - P_{m(m=ms)} = -(m - ms)$$

Figure 9:
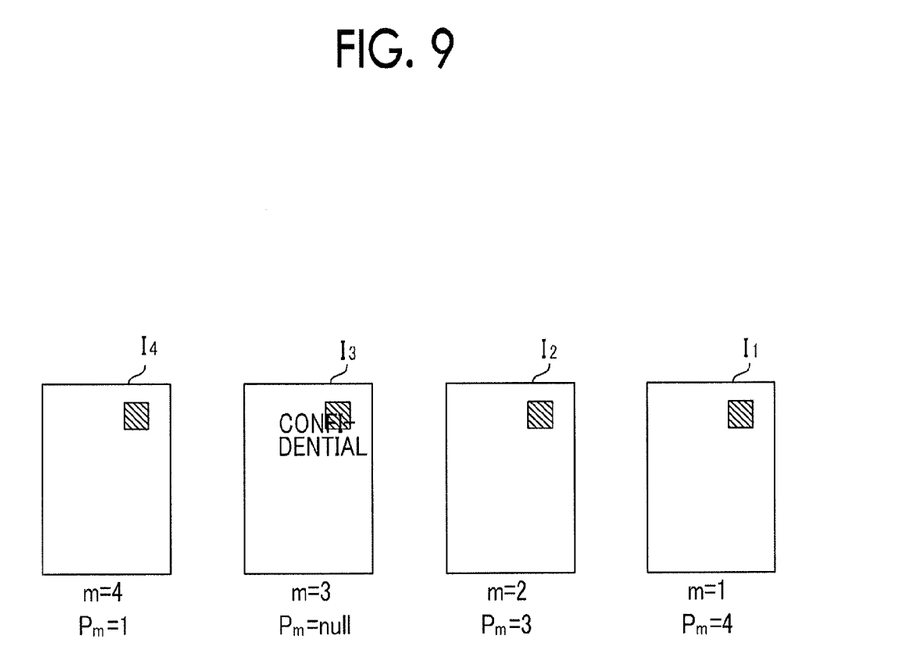
FIG. 9 is a diagram illustrating a scan image sequence.

In the case of FIG. 9, although the scan image $I_1$ is the reference scan image I, as can be understood from FIG. 9, the scan number "ms" is "1", and the decoded page number "$P_{m(m=ms)}$" is "4". Looking at the normal scan image $I_2$, since the scan number "m" is "2", and the decoded page number "$P_m$" is "3", the above equation is satisfied. Moreover, looking at the normal scan image $I_4$, since the scan number "m" is "4", and the decoded page number "$P_m$" is "1", the above equation is satisfied. That is, in the case of FIG. 9, since the above equation is satisfied in both the normal scan image $I_2$ and the normal scan image $I_4$, a positive determination result is obtained in step S108.

When a negative determination result is obtained in both steps S107 and S108 (S108: N), that is, when it is not possible to estimate the information embedded in the QR code in the abnormal scan image I, the controller 4 outputs a predetermined error message to the display 8 (S108b). This is because it is not possible to specify the decoded page number $P_{m(m=my)}$ corresponding to the abnormal scan image I. This error message is also output when a negative determination result is obtained in step S105 (S105: N).

When a positive determination result is obtained in step S107 or S108, the controller 4 determines the decoded page number $P_{m(m=my)}$ corresponding to the abnormal scan image I as described below. That is, when a positive determination result is obtained in step S107 (S107: Y), the controller 4 calculates the decoded page number $P_{m(m=my)}$ according to the following expression (S107a).

$$P_{m(m=my)} = my - ms + P_{m(m=ms)}$$

For example, in the case of FIG. 8, since the reference scan image I is the scan image $I_1$, both the decoded page number "$P_{m(m=ms)}$" and the scan number "ms" are "1." Thus, since the scan number "my" of the abnormal scan image $I_2$ is "2," the decoded page number $P_{m(m=my)}$ corresponding to the abnormal scan image $I_2$ is "2."

Moreover, when a positive determination result is obtained in step S108 (S108: Y), the controller 4 calculates the decoded page number $P_{m(m=my)}$ according to the following expression (S108a).

$$P_{m(m=my)} = -my + ms + P_{m(m=ms)}$$

Figure 10:
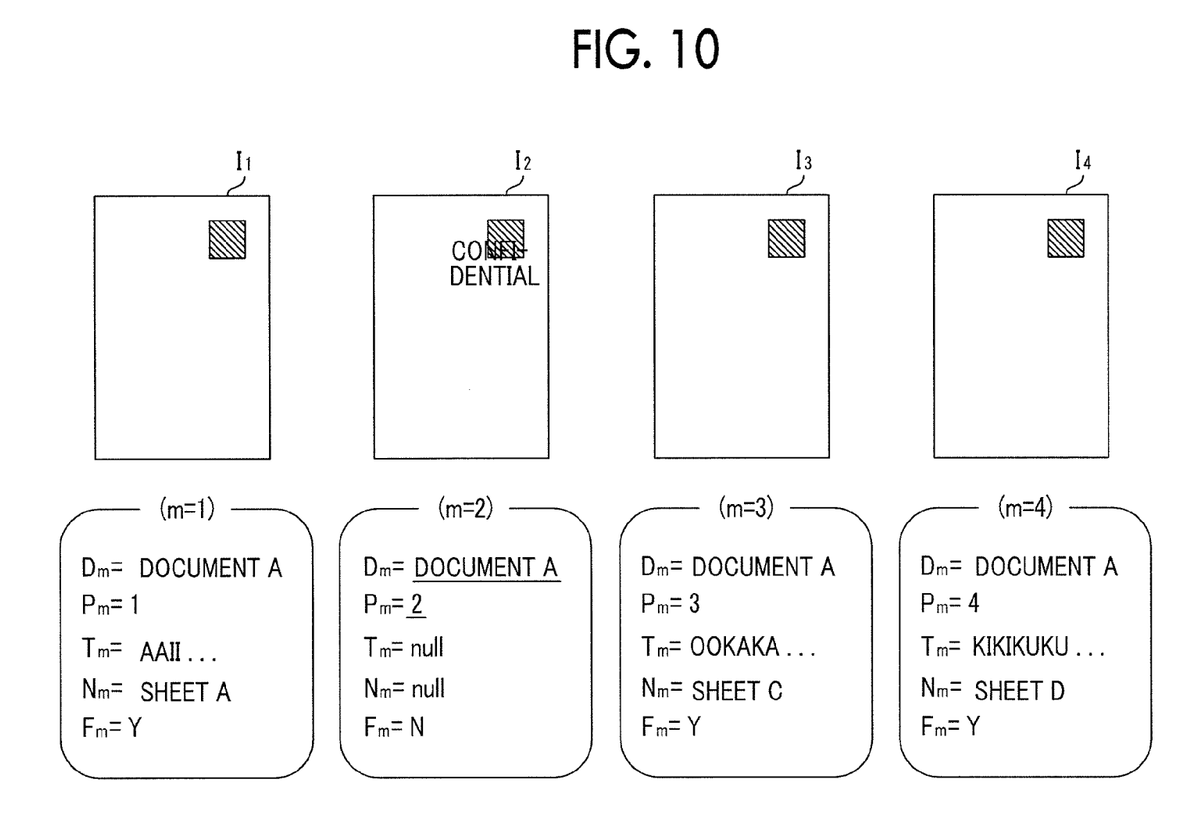
FIG. 10 is a diagram conceptually illustrating the content of the record of respective scan images.

For example, in the case of FIG. 9, since the scan image $I_1$ is the reference scan image I, the scan number "ms" is "1" and the decoded page number "$P_{m(m=ms)}$" is "4." Thus, since the scan number "my" of the abnormal scan image $I_3$ is "3," the decoded page number $P_{m(m=my)}$ corresponding to the abnormal scan image $I_3$ is "2". FIG. 10 conceptually illustrates the content of the records of the respective scan images I immediately after the process of step S107a or S108a is executed.

Figure 11:
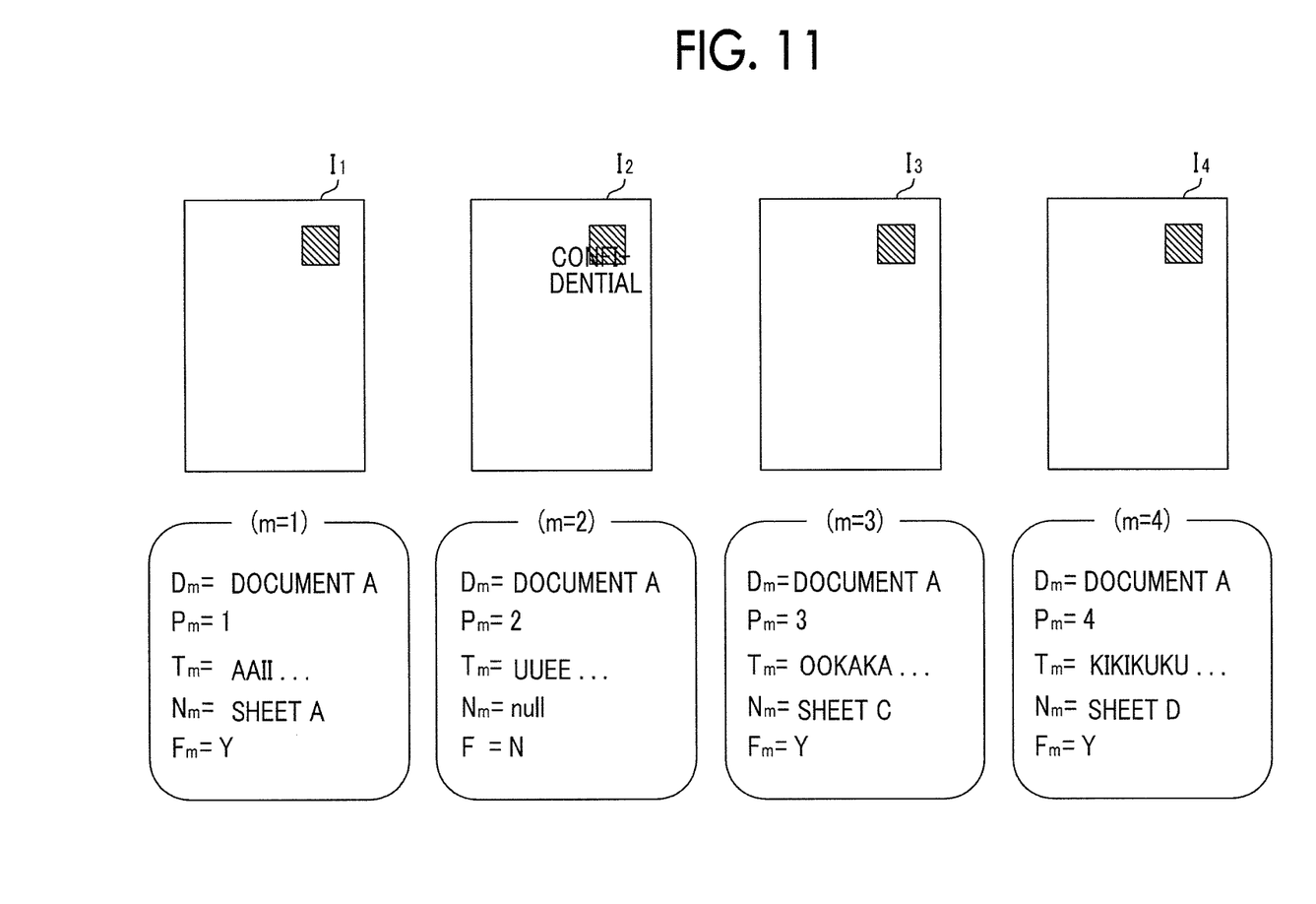
FIG. 11 is a diagram conceptually illustrating the content of the record of respective scan images.

In this way, when the decoded page number $P_{m(m=my)}$ is specified, the controller 4 determines the value of the decoding text information $T_{m(m=my)}$ based on the decoded page number $P_{m(m=my)}$ and the decoding document ID "$D_{m(m=my)}$" (S109). That is, the controller 4 specifies a history record that includes a page number "n" having the same value as the decoded page number $P_{m(m=my)}$ and the same document ID value as the decoding document ID "$D_{m(m=my)}$" among the history records (see FIG. 3) stored in the hard disk 14 and sets the text information included in the specified history record as the value of the decoding text information $T_{m(m=my)}$ (S109). For example, in the case of FIG. 10, the second history record (see FIG. 3) from the top that includes the document ID value "document A" and the page number "2" is specified, and the text information "UUEE . . . " included in the history record is set as the value of the decoding text information $T_{m(m=2)}$. FIG. 11 conceptually illustrates the content of the records of the respective scan images I immediately after the process of step S109 is executed.

After that, the controller 4 executes the processes of steps S110 and S111 with respect to the abnormal scan image $I_{m(m=my)}$.

That is, the controller 4 generates a combined image obtained by combining an image of the "$P_{m(m=my)}$"-th page of the document of which the document ID value is "$D_{m(m=my)}$" and a QR code in which a newly issued sheet ID value "$N_{new}$" and the decoding text information "$T_{m(m=my)}$" are embedded (S110) and causes the printer 16 to print the combined image (S111). Moreover, the controller 4 generates a record that includes the sheet ID value "$N_{new}$", the document ID value "$D_{m(m=my)}$", the page number value "$P_{m(m=my)}$", and the text information "$T_{m(m=my)}$" and stores the record in the hard disk 14 as a history record.

In this way, in the image processing device 2, a page number that is estimated to be the decoded page number of the abnormal scan image I is obtained from the decoded page number that is specified from the QR code in the normal scan image I. As a result, even if it is difficult to acquire the text information from the QR code image in the abnormal scan image I, it is possible to obtain the text information that is estimated to be embedded in the QR code image.

The exemplary embodiment of the invention is not limited to the above exemplary embodiment.

For example, in the above exemplary embodiment, although only the sheet ID and the text information are embedded in the QR code, a page number value and a document ID value may also be embedded in the QR code in addition to these items of information. In this case, it is not always necessary to store the history record (see FIG. 3) in the hard disk 14.

Moreover, for example, the reference scan image is not limited to the normal scan image having the smallest scan number "m," but an optional normal scan image may be set as the reference scan image. Moreover, the history record may be stored in a database server that is separated from the image processing device 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   a history record storage unit that stores a history record comprising text information and a page number that are embedded in a two-dimensional code printed on each sheet of a combined image;
   an image sequence acquisition unit that acquires a read image sequence comprising read images that are sequentially read by an image reading unit from each of a plurality of sheets on which the two-dimensional code is printed;
   a page number specifying unit that specifies the page number corresponding to each of the read images in the read image sequence using a reading result of the two-dimensional code image in the read image;
   a page number determining unit that determines the page number corresponding to a target image which is a read image of which the page number is not specified by the page number specifying unit, using a position of the target image in the read image sequence, a position in the read image sequence, of the read image of which the page number is specified by the page number specifying unit, and the page number corresponding to the read image of which the page number is specified by the page number specifying unit;
   a decoding text information specifying unit that specifies decoding text information corresponding to the target image using the text information that is stored in the history record storage unit and the page number corresponding to the target image that is determined by the page number determining unit; and
   a print unit that prints a two-dimensional code in which the specified decoding text information is embedded.

2. The image processing device according to claim 1, wherein
   the page number determining unit determines a page number corresponding to a type of a relation that is commonly satisfied by the respective read images, of which the page number is specified by the page number specifying unit, as the page number corresponding to the target image.

3. The image processing device according to claim 2, wherein
   the two-dimensional code is a two-dimensional code that enables not only the page number of a document but also the document to be specified,
   the page number specifying unit specifies the page number corresponding to each of the read images in the read image sequence and the document corresponding to each of the read image using a reading result of the two-dimensional code image in the read image, and
   the page number determining unit determines the page number corresponding to the target image when the documents corresponding to the respective read images of which the page number is specified by the page number specifying unit are the same.

4. The image processing device according to claim 1, wherein
   the two-dimensional code is a two-dimensional code that enables not only the page number of a document but also the document to be specified,
   the page number specifying unit specifies the page number corresponding to each of the read images in the read image sequence and the document corresponding to each of the read images using a reading result of the two-dimensional code image in the read image, and
   the page number determining unit determines the page number corresponding to the target image when the documents corresponding to the respective read images of which the page number is specified by the page number specifying unit are the same.

5. A non-transitory computer readable medium storing a program for causing a computer to function as:

a history record storage unit that stores a history record comprising text information and a page number that are embedded in a two-dimensional code printed on each sheet of a combined image;

an image sequence acquisition unit that acquires a read image sequence comprising read images that are sequentially read by an image reading unit from each of a plurality of sheets on which the two-dimensional code is printed;

a page number specifying unit that specifies the page number corresponding to each of the read images in the read image sequence using a reading result of the two-dimensional code image in the read image;

a page number determining unit that determines the page number corresponding to a target image which is a read image of which the page number is not specified by the page number specifying unit using a position of the target image in the read image sequence, a position in the read image sequence, of the read image of which the page number is specified by the page number specifying unit, and the page number corresponding to the read image of which the page number is specified by the page number specifying unit;

a decoding text information specifying unit that specifies decoding text information corresponding to the target image using the text information that is stored in the history record storage unit and the page number corresponding to the target image that is determined by the page number determining unit; and a print unit that prints a two-dimensional code in which the specified decoding text information is embedded.

6. An image processing method comprising:

storing a history record comprising text information and a page number that are embedded in a two-dimensional code printed on each sheet of a combined image;

acquiring a read image sequence comprising read images that are sequentially read by an image reading unit from each of a plurality of sheets on which the two-dimensional code is printed;

specifying the page number corresponding to each of the read images in the read image sequence using a reading result of the two-dimensional code image in the read image;

determining the page number corresponding to a target image which is a read image of which the page number is not specified using a position of the target image in the read image sequence, a position in the read image sequence, of the read image of which the page number is specified, and the page number corresponding to the read image of which the page number is specified;

specifying decoding text information corresponding to the target image using the stored text information and the page number corresponding to the target image that is determined; and printing a two-dimensional code in which the specified decoding text information is embedded.

* * * * *